United States Patent [19]

Suzuki

[11] 4,169,375
[45] Oct. 2, 1979

[54] MAGNETIC FLOWMETER

[75] Inventor: Kazuie Suzuki, Tokyo, Japan

[73] Assignee: Hokushin Electric Works, Ltd., Tokyo, Japan

[21] Appl. No.: 888,631

[22] Filed: Mar. 21, 1978

[30] Foreign Application Priority Data

Mar. 31, 1977 [JP] Japan .................................. 52/36462

[51] Int. Cl.² .............................................. G01F 1/60
[52] U.S. Cl. ............................................. 73/194 EM
[58] Field of Search .................................. 73/194 EM

[56] References Cited

U.S. PATENT DOCUMENTS

| 3,570,309 | 3/1971 | Birnstingl | 73/194 EM |
| 3,603,146 | 9/1971 | Bennett et al. | 73/194 EM |
| 3,902,366 | 9/1975 | Gruner | 73/194 EM |
| 4,059,014 | 11/1977 | Torimaru | 73/194 EM |

Primary Examiner—Charles A. Ruehl
Attorney, Agent, or Firm—Michael Ebert

[57] ABSTRACT

A magnetic flowmeter whose electromagnet is excited by a low-frequency excitation current, the flowmeter including flow tube electrodes yielding a flow rate signal. A reference voltage-detecting transformer is provided in the excitation circuit to produce a reference voltage that reflects fluctuations in the excitation current. Fluctuations in the flow rate signal as a result of fluctuations in the excitation current are eliminated by dividing the flow rate signal by the reference-voltage signal.

5 Claims, 48 Drawing Figures

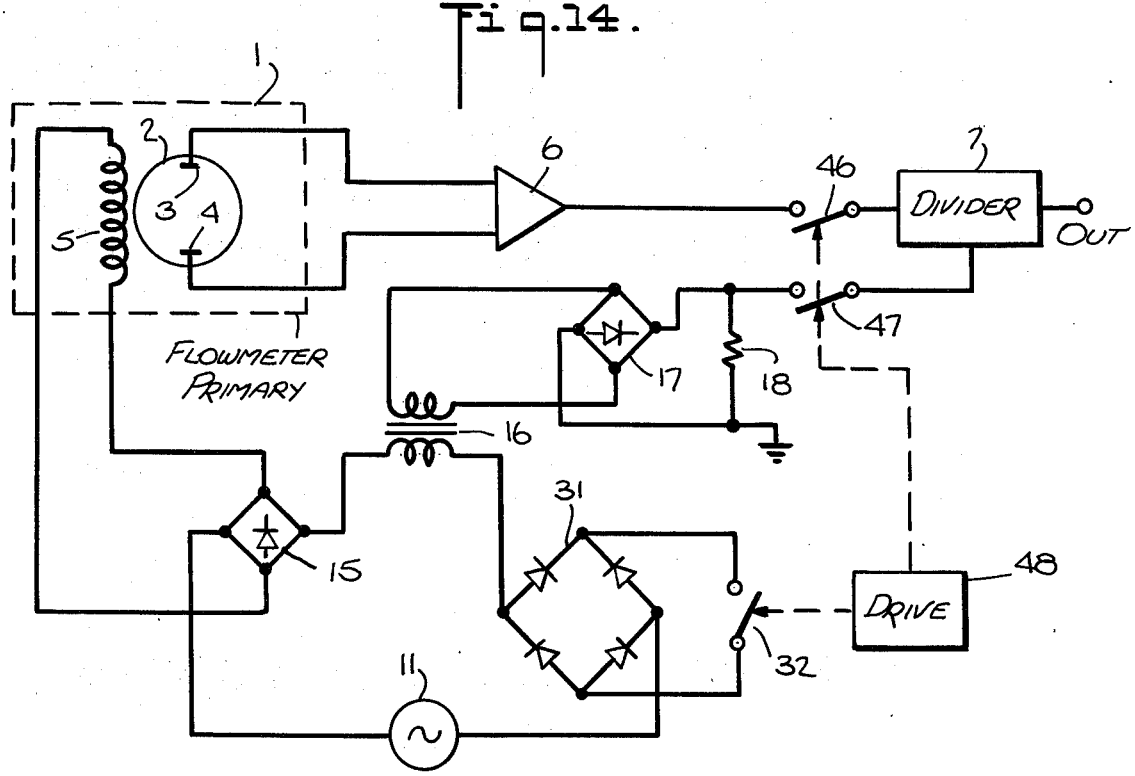
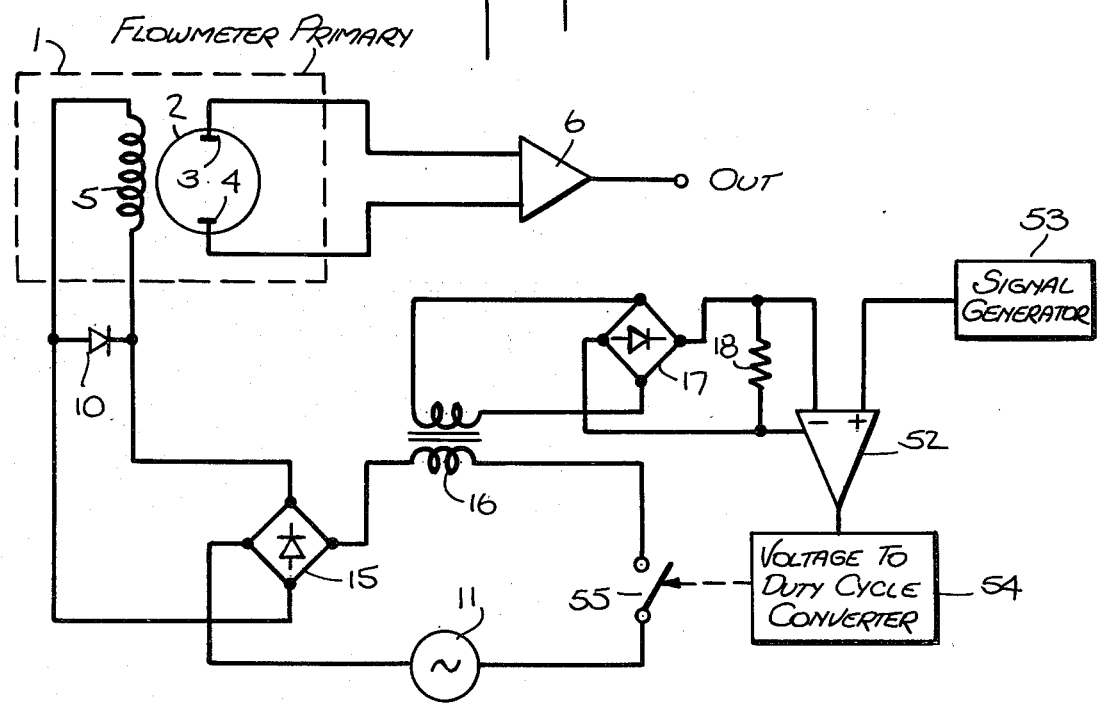

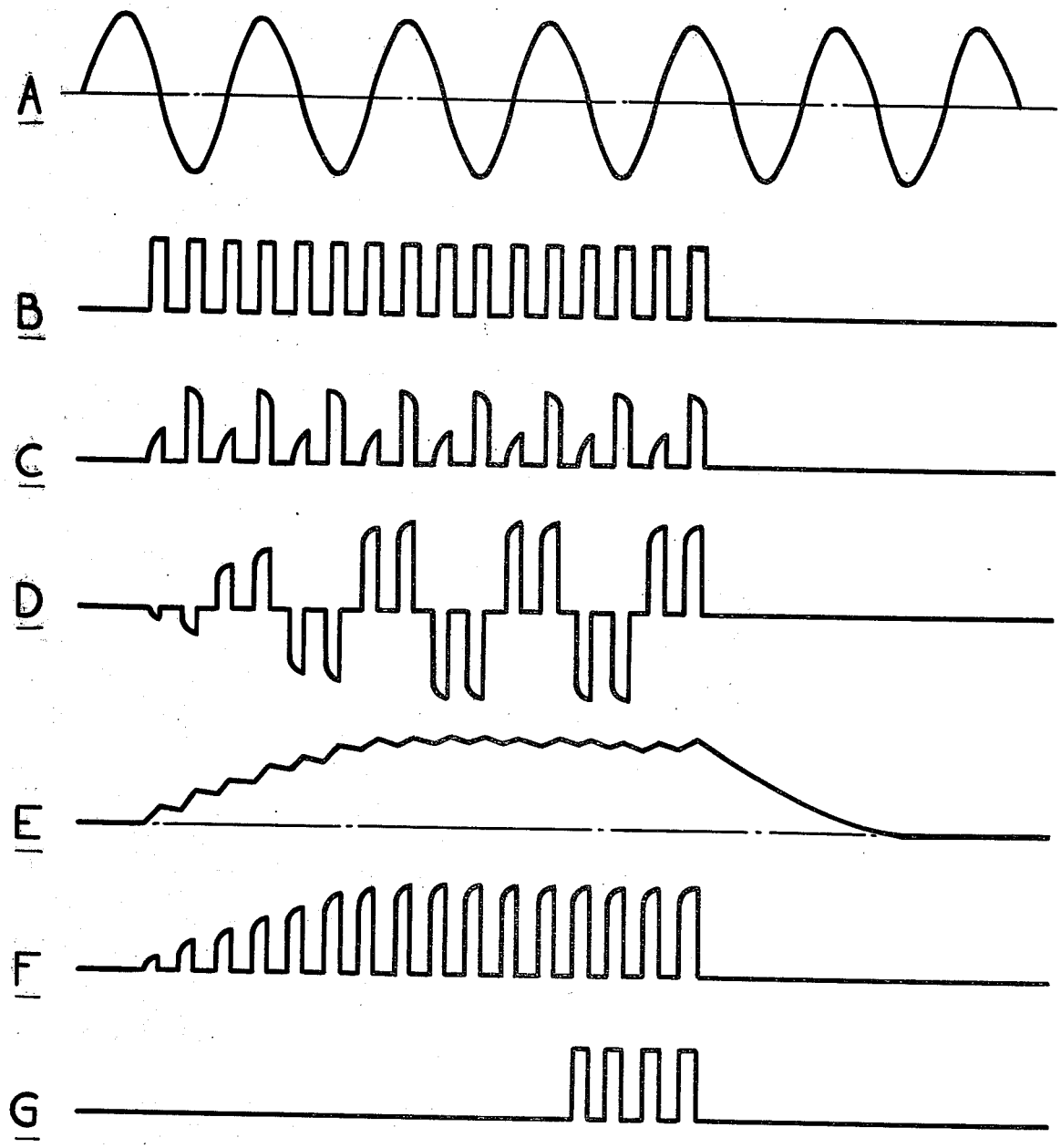

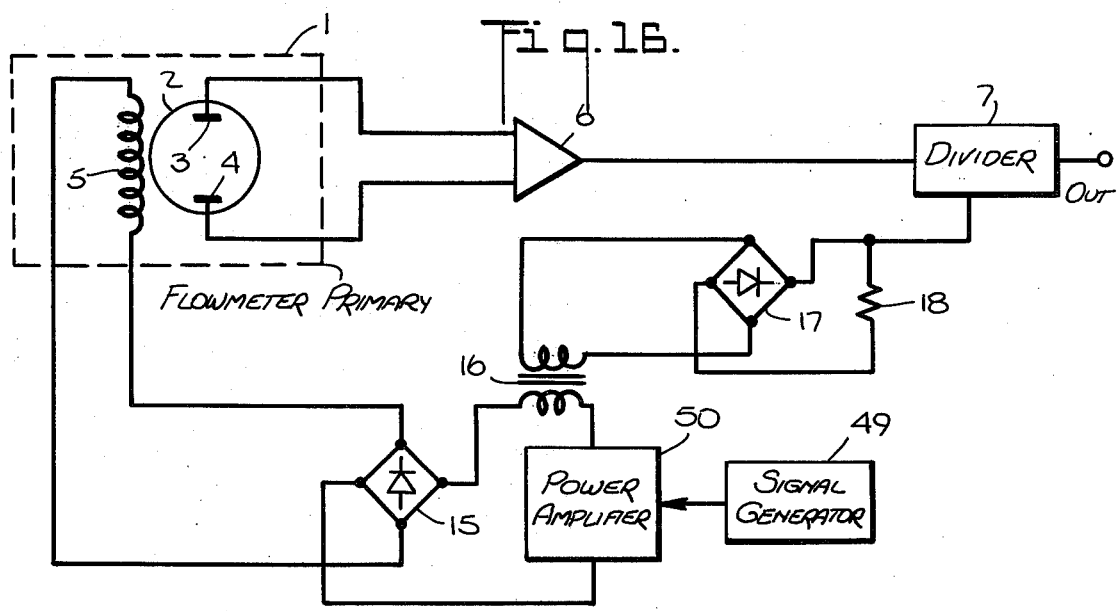
Fig. 16.
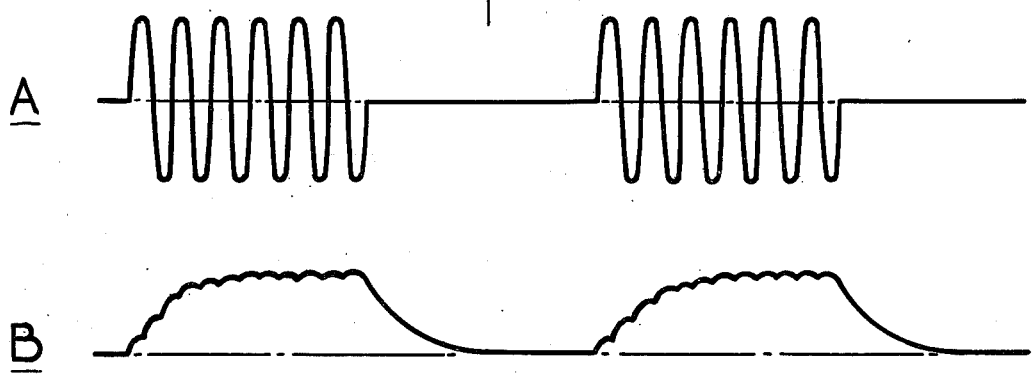
Fig. 17.
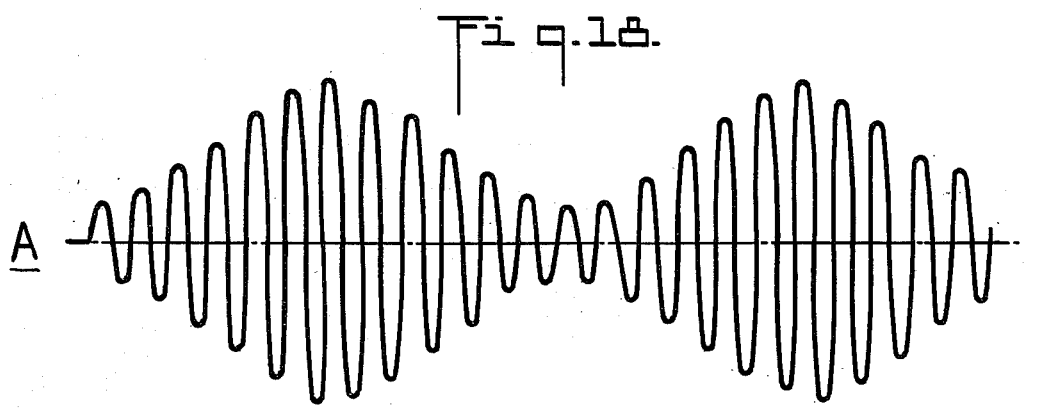
Fig. 18.
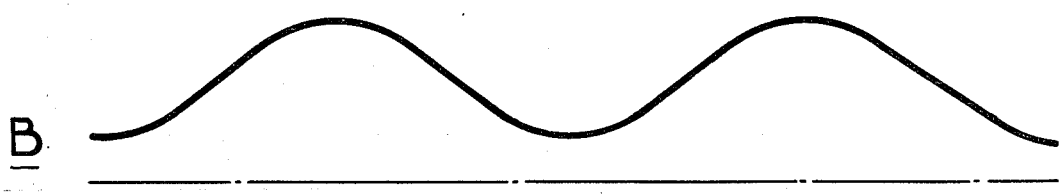

MAGNETIC FLOWMETER

BACKGROUND OF INVENTION

This invention relates generally to magnetic flowmeters, and more particularly to a reference-voltage detecting circuit in a magnetic flowmeter whose electromagnet is excited by low-frequency or direct current.

In a magnetic flowmeter, an electromagnetic field is established therein by an electromagnet having an excitation coil, the field being intercepted by a fluid passing through the flow tube to induce a flow rate signal in a pair of diametrically-opposed electrodes.

Magnetic flowmeters are known which make use of a low-frequency excitation current, such as one whose excitation frequency is well below that of the commercial power-line frequency. One can, by means of a low-frequency excitation type magnetic flowmeter, obtain a flow rate signal having an excellent signal-to-noise ratio; for unwanted magnetic coupling and/or electrostatic coupling between the excitation coil and the signal lead wires connected to the flow tube electrodes may be reduced considerably.

In order to eliminate unwanted fluctuations from the flow rate signal yielded by a low-frequency excitation type magnetic flowmeter, which result from fluctuations in the excitation current for the electromagnet, the general practice is to provide a reference voltage-detecting circuit. This circuit is arranged to produce a reference voltage proportional to the excitation current, the ratio of this reference voltage to the flow rate signal being determined by means of a converter or divider.

To produce the reference voltage, it is known to interpose a resistor in the excitation circuit, the voltage drop across the resistor being proportional to the excitation current and therefore reflecting fluctuations in this current. The use of a resistor for this purpose has a number of disadvantages. For example, though it is desirable that the resistor have a low ohmic value in order to minimize the heat generated therein by reason of IR drop, in using a resistor of small value, the resultant reference voltage has a low level which requires amplification and adds to the cost and size of the instrument.

SUMMARY OF INVENTION

In view of the foregoing, the main object of this invention is to provide an improved reference voltage-detecting circuit which makes use of a small-size current transformer in lieu of a resistor to effect precise detection of the reference voltage.

Briefly stated, in a magnetic flowmeter whose electromagnet is excited by a low-frequency or direct current, the excitation current, in an arrangement in accordance with the invention, is produced by rectifying a-c power having a relatively high frequency (i.e., 50 or 60 Hz) derived from a commercial power source, a reference voltage-detecting transformer being included in the rectifying circuit to provide a reference voltage signal.

Fluctuations in the flow rate signal as a result of fluctuations in the excitation current are eliminated by dividing the flow rate signal derived from the electrodes of the flowmeter with the reference voltage.

OUTLINE OF DRAWINGS

For a better understanding of the invention as well as other objects and further features thereof, reference is made to the following detailed description to be read in conjunction with the accompanying drawings, wherein.

Figure 2:
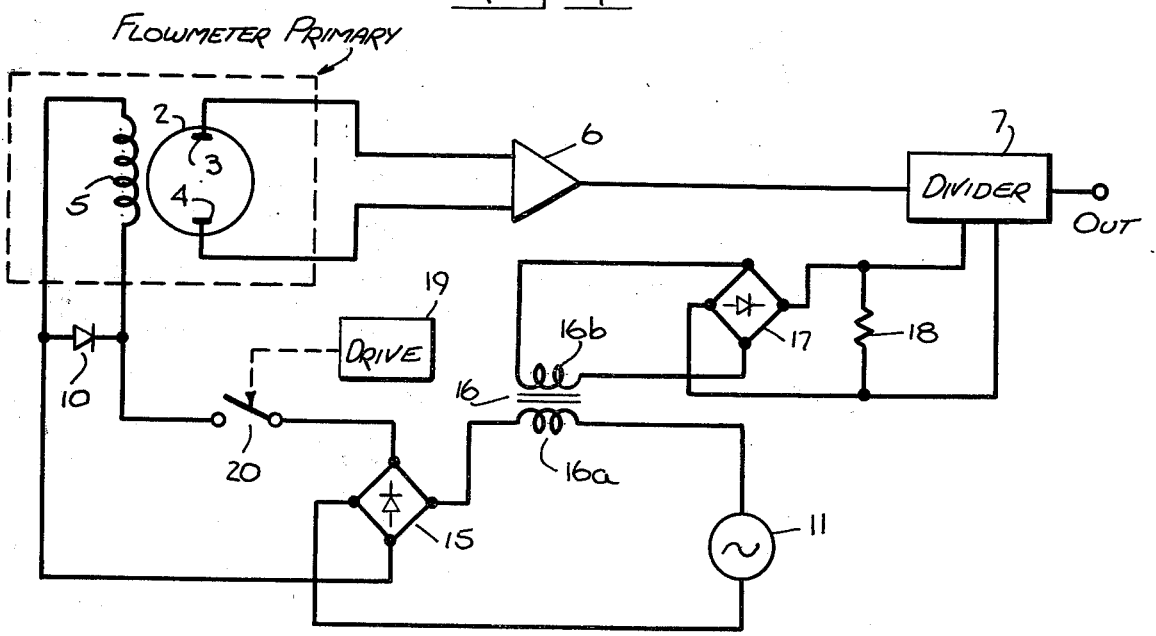
FIG. 2 is a schematic diagram of a first preferred embodiment of a magnetic flowmeter having a reference voltage-detecting circuit in accordance with the present invention.
Figure 4:
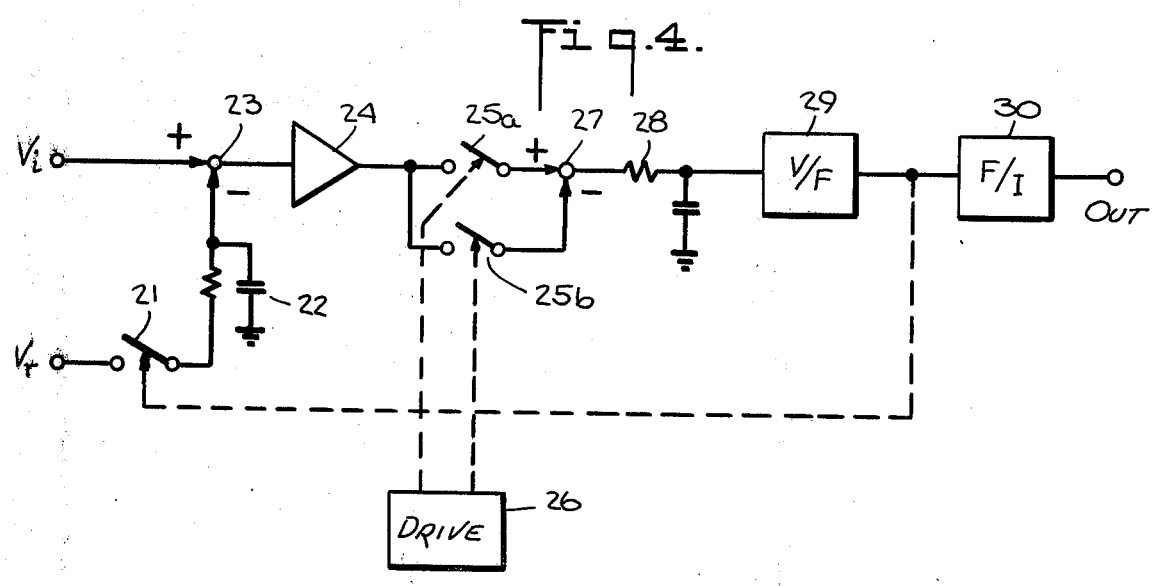
Figure 6:
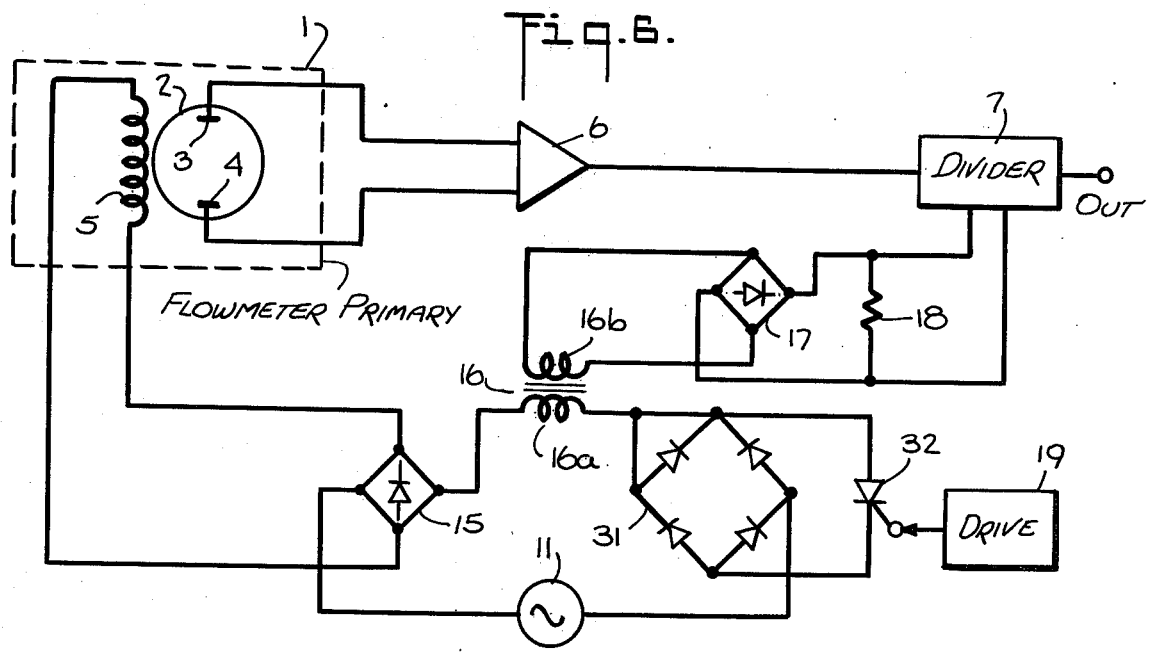
Figure 7:
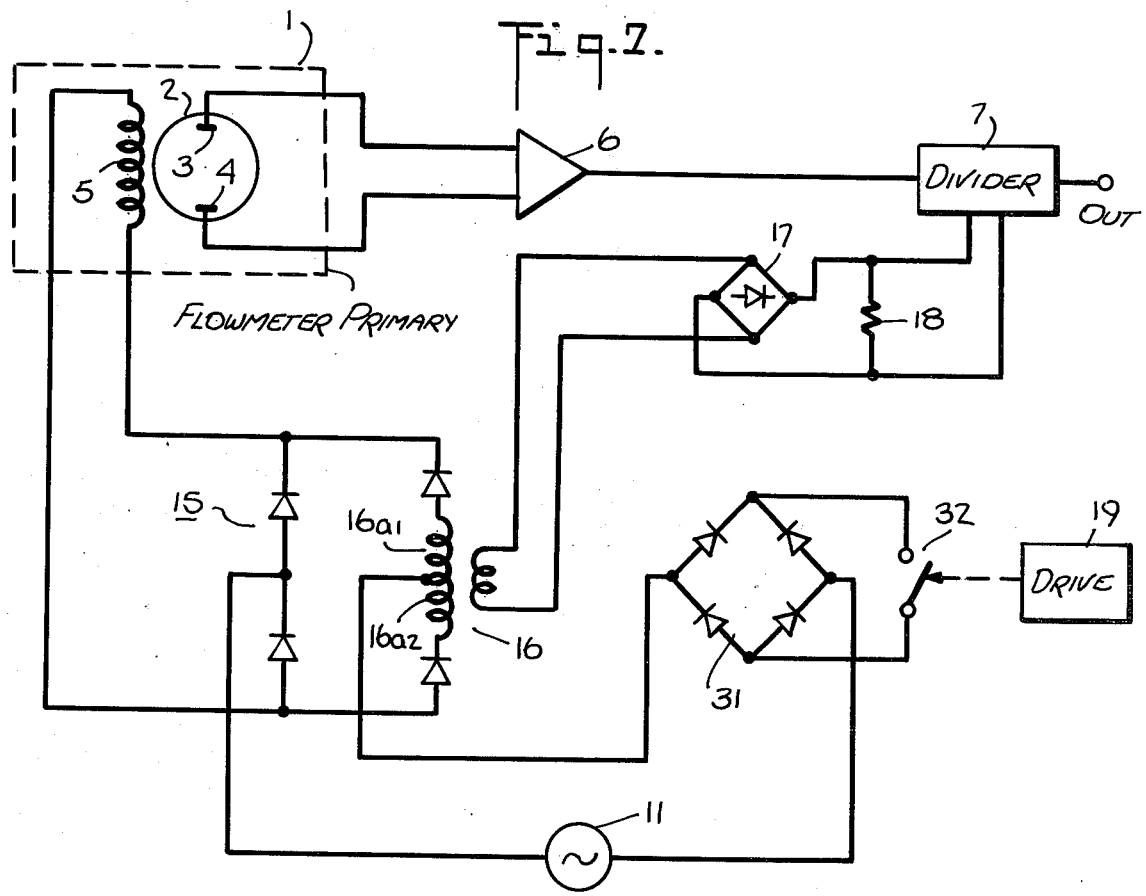
Figure 8:
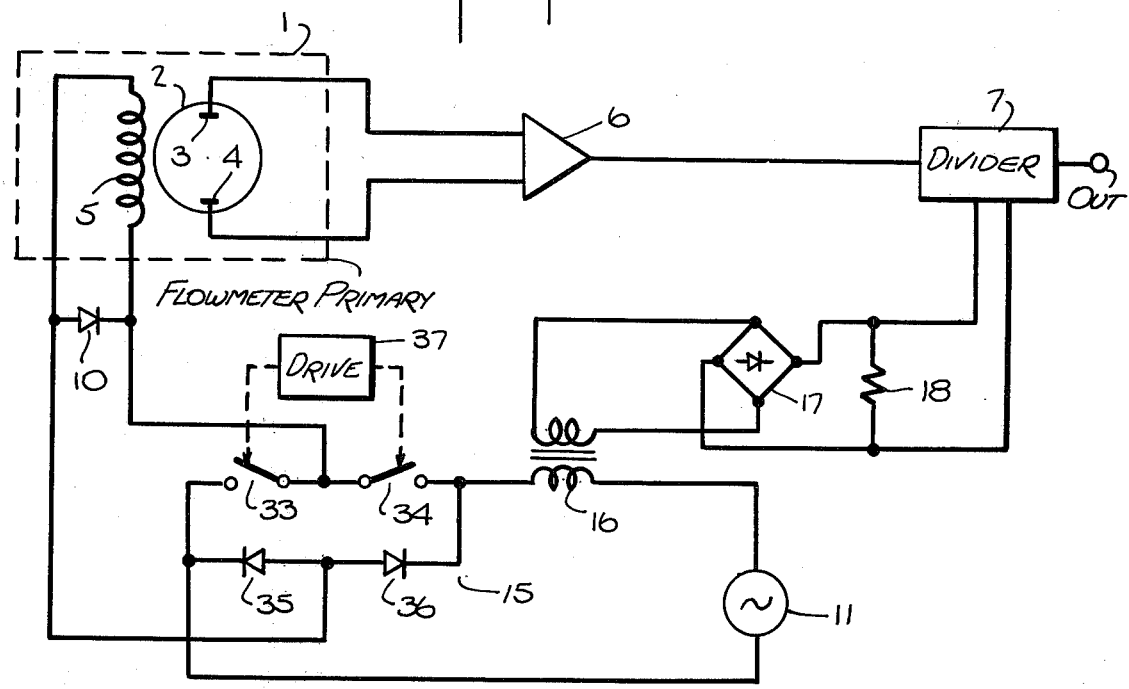
Figure 10:
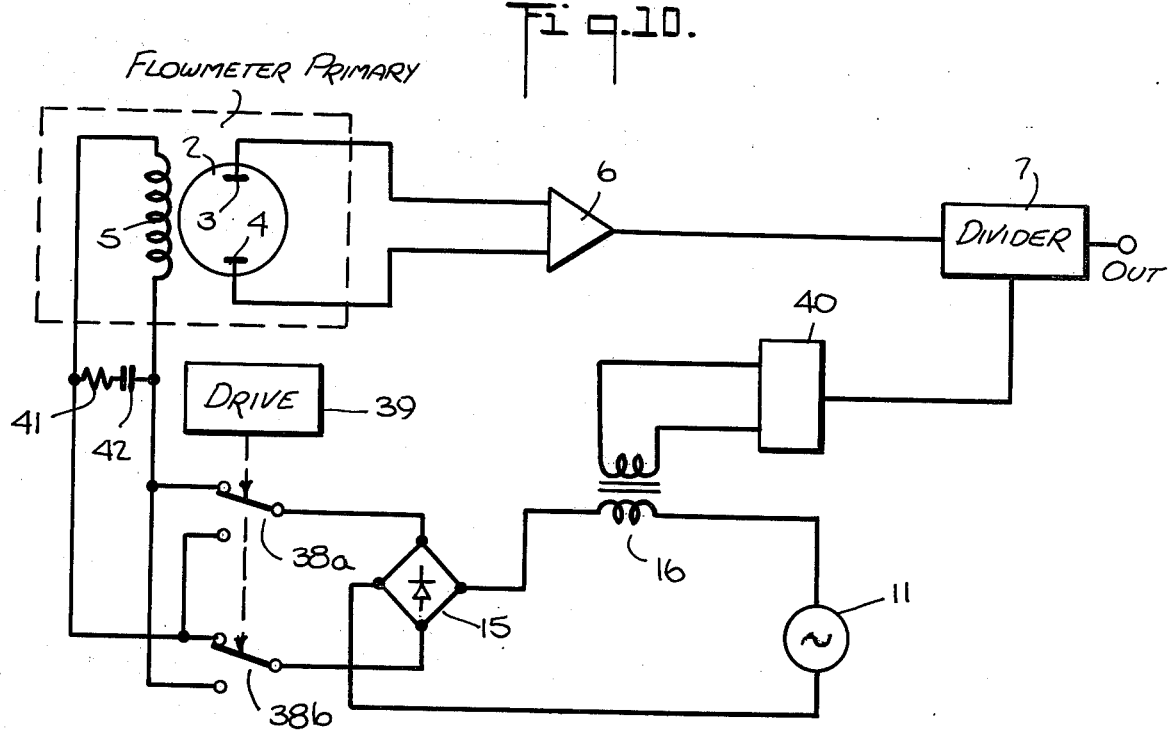
Figure 11:
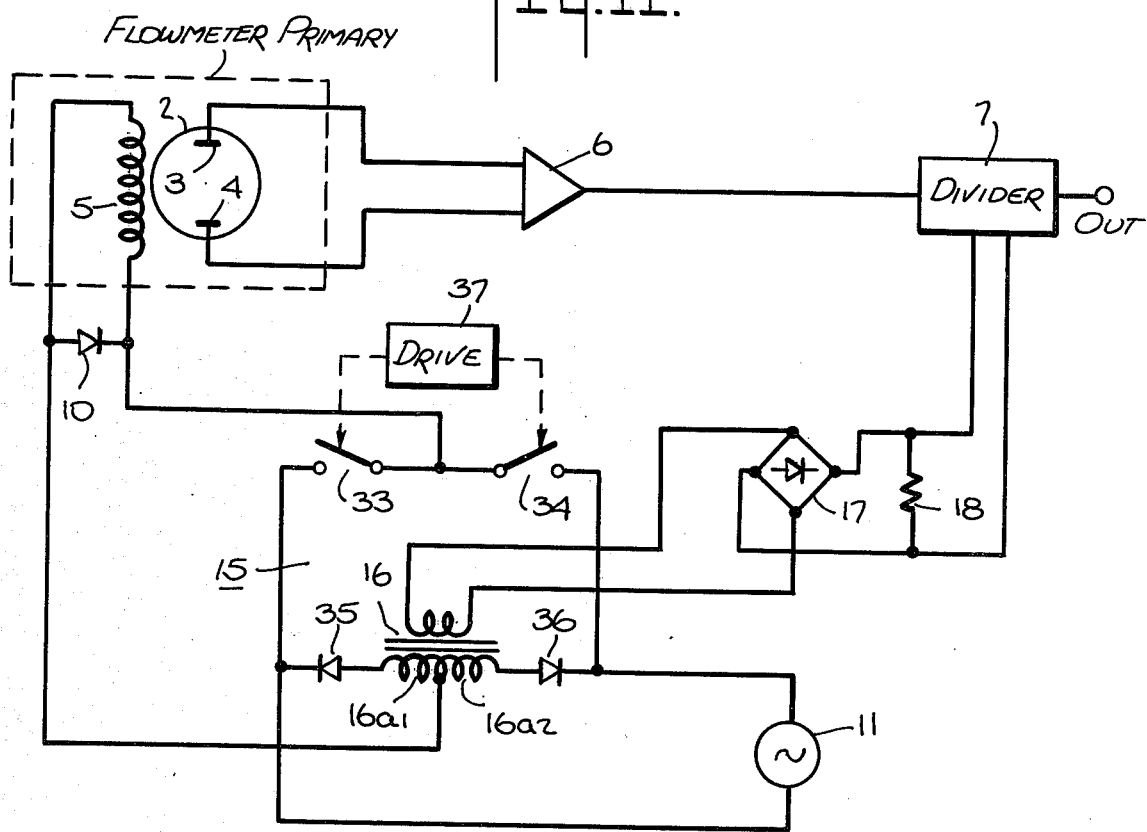
Figure 12:
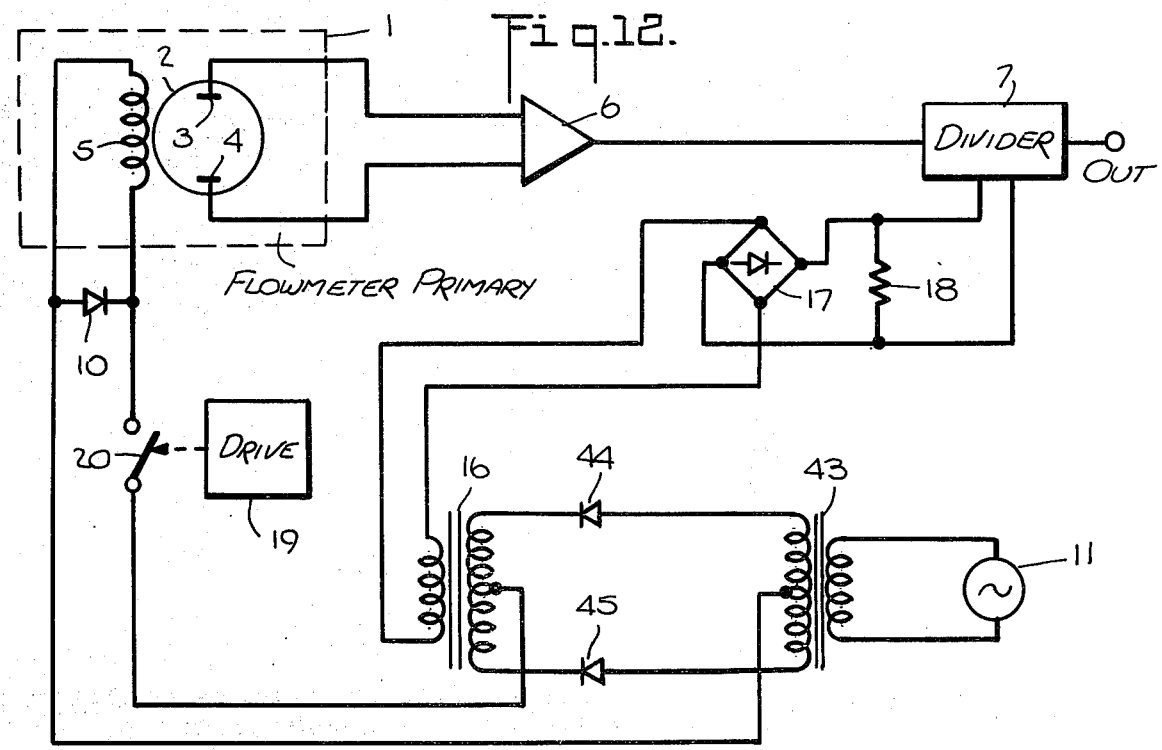
Figure 19:
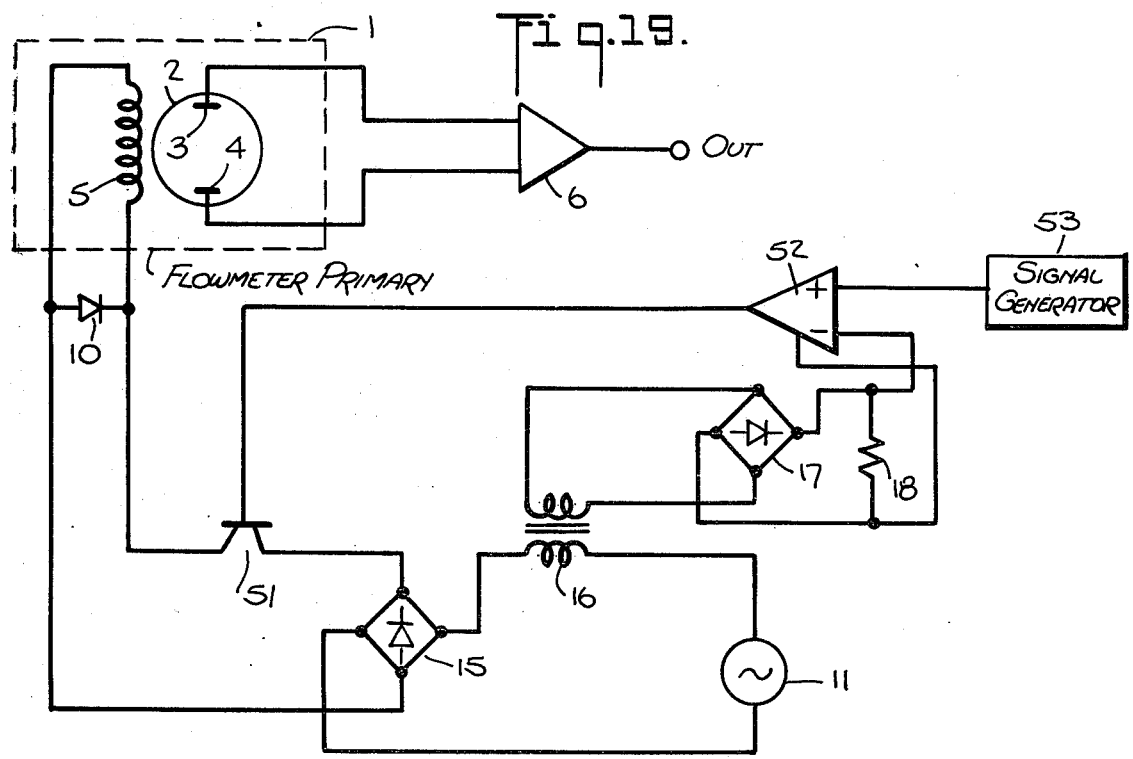

FIGS. 3A to F are wave forms illustrative of the operation of the magnetic flowmeter shown in FIG. 2;

FIG. 4 is a schematic diagram of one example of the divider circuit incorporated in the magnetic flowmeter shown in FIG. 2;

FIGS. 5A to D are wave forms illustrating the function of the divider circuit shown in FIG. 4;

FIGS. 6, 7 and 8 are schematic diagrams respectively showing the second, third and fourth embodiments of the invention;

FIGS. 9A to D are wave forms illustrating the operation of the magnetic flowmeter shown in FIG. 8;

FIGS. 10, 11 and 12 are schematic diagrams respectively showing the fifth, sixth and seventh embodiments of the invention;

FIGS. 13A to E are wave forms illustrating the operation of the magnetic flowmeter when its excitation coil is excited in various ways;

FIG. 14 is a schematic diagram of an eighth embodiment of the invention;

FIGS. 15A to G are wave forms, illustrating the operation of the magnetic flowmeter shown in FIG. 14;

FIG. 16 is a schematic diagram of a ninth embodiment of the invention;

FIGS. 17A and 17B are wave forms illustrating the operation of the magnetic flowmeter shown in FIG. 16, whose excitation coil is energized by low-frequency current;

FIGS. 18A and 18B are waveforms illustrating the operation of the magnetic flowmeter shown in FIG. 16 when its excitation coil is energized by a low-frequency excitation current differing from that in FIG. 17;

FIG. 19 is a schematic diagram of a tenth embodiment of the invention;

FIGS. 20A to E are wave forms illustrating the operation of the magnetic flowmeter shown in FIG. 19;

FIG. 21 is a schematic diagram of an eleventh embodiment in accordance with this invention.

DESCRIPTION OF INVENTION

Conventional Flowmeter

Figure 1:
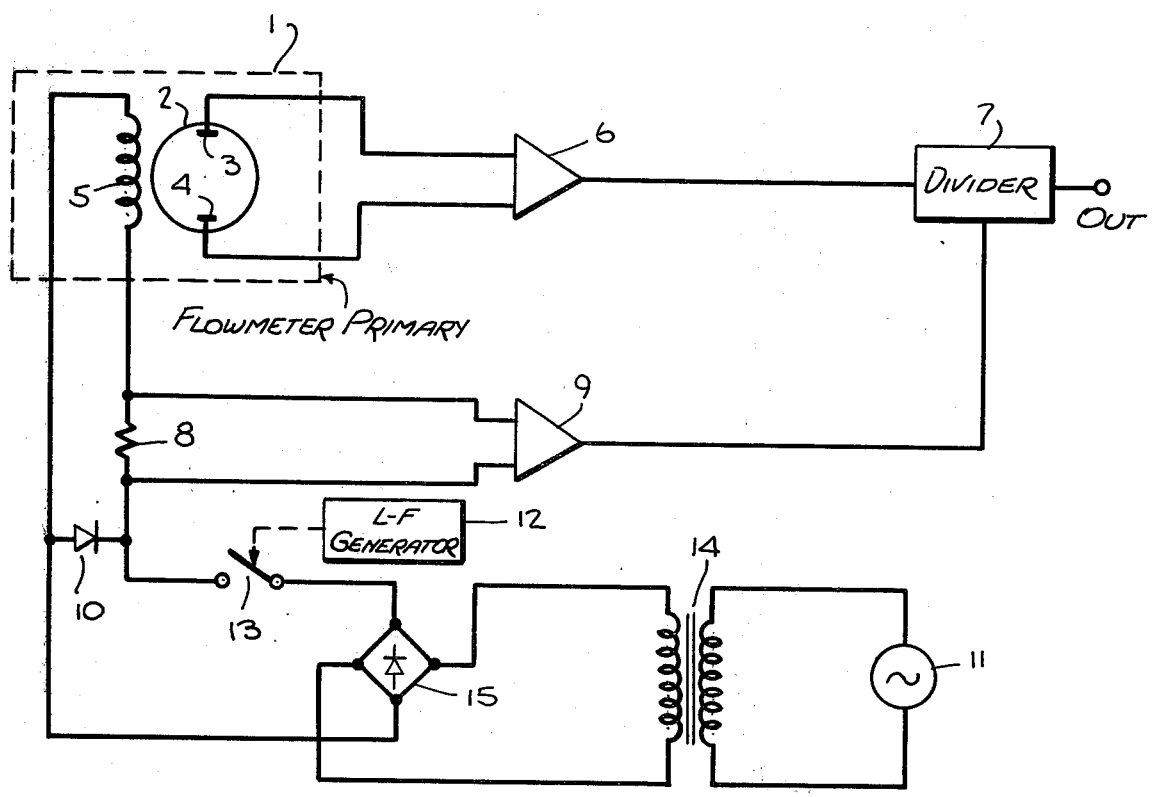
FIG. 1 is a schematic diagram of a standard magnetic flowmeter provided with a conventional reference voltage-detecting circuit.

FIG. 1 is a schematic diagram of a conventional magnetic flowmeter arrangement. Magnetic flowmeter 1 is composed of a flow tube 2 through which liquid to be metered is conducted, a pair of electrodes 3 and 4 mounted at diametrically-opposed positions on tube 2, and an excitation coil 5 serving to generate a magnetic field normal to the longitudinal axis of tube 2 and to the transverse axis passing through electrodes 3 and 4. The voltage induced in the fluid is transferred to electrodes 3 and 4, and the voltage developed therebetween, which has a level proportional to the volumetric flow rate, is amplified by an amplifier 6. The output of amplifier 6 is applied to a divider 7.

A resistor 8 in series with an excitation circuit including coil 5 serves to detect the excitation current to produce a reference voltage. An amplifier 9 acts to amplify the reference voltage generated across resistor 8. A diode 10 connected across the excitation current circuit serves to discharge transient energy spikes induced in excitation coil 5.

A commercial power line source 11 is connected to the primary winding of a power transformer 14 which functions to isolate the excitation circuit from the power source. The secondary winding of this transformer is connected to the input junctions of a rectifying bridge 15. The d-c voltage yielded at the output junctions of bridge 15 is applied through a switching element 13 to a series circuit constituted by reference voltage-detecting resistor 8 and excitation coil 5. Switching element 13 is "on-off" controlled at a low-frequency rate less than that of a commercial power line frequency (50 or 60 Hz); i.e., a few Hz by means of low-frequency generator 12.

With this known arrangement, a flow rate signal which is proportional to the induced voltage between electrodes 3 and 4 when coil 5 is excited by a low-frequency current is divided in divider 7 by the reference signal proportional to the voltage generated across reference voltage-detecting resistor 8, thereby eliminating the unwanted influence of fluctuations in the excitation current on the output signal.

The above-described conventional magnetic flowmeter excitation arrangement has several drawbacks, among which are the following:

(1) To isolate an excitation current from the commercial power source, a large size power transformer 14 is required. As a consequence, the total cost for manufacturing the flowmeter is high and the size of the flowmeter is bulky.

(2) Since the current flow through reference-voltage detecting resistor 8 is heavy, the resultant heat produced in this resistor and radiated therefrom is significant and represents a problem.

(3) While the radiant heat from resistor 8 can be reduced by using a resistor of the smallest possible ohmic value, it is difficult to obtain a resistor of such low value which also has a constant resistance characteristic. If in order to overcome this problem one uses a bank of stable resistors in parallel to provide the desired low ohmic resistance, this expedient increases the size of the reference voltage resistor.

(4) Because the resistance value of resistor 8 is very small, this necessitates a signal amplifier 9 so as to amplify the detected signal applied to divider 7.

(5) To overcome these drawbacks, one could conceivably employ a current transformer in place of resistor 8. However, since the frequency of the excitation current flowing therein is very low, precise reference voltage detection is impossible by means of an ordinary current transformer, and a large-size transformer is then required for this purpose, with all its attendant disadvantages.

First Embodiment

Referring now to FIG. 2, there is shown a magnetic flowmeter, the coil of which is excited by a low-frequency or direct current, the flowmeter having a reference voltage-detecting circuit in accordance with this invention. In this figure, the same symbols used in FIG. 1 designate virtually identical components.

A current transformer 16 which serves to detect a reference voltage is interposed between the commercial power line source 11 and rectifying bridge 15, whereby the ends of its primary winding 16a are connected between one input junction of rectifying bridge 15 and one end of the power line source 11.

A rectifying bridge 17 is connected to the secondary winding 16b of current transformer 16. A load resistor 18 functioning as a load resistor for current transformer 16 is shunted across the lines leading from the output junctions of bridge 17 to divider circuit 7, whereby the voltage generated across resistor 18 is supplied to divider circuit 7 as a reference voltage. A switching element 20 is interposed between rectifying bridge 15 and excitation coil 5, the element being "on-off" controlled by the output of a switch drive circuit 19.

Figure 3:
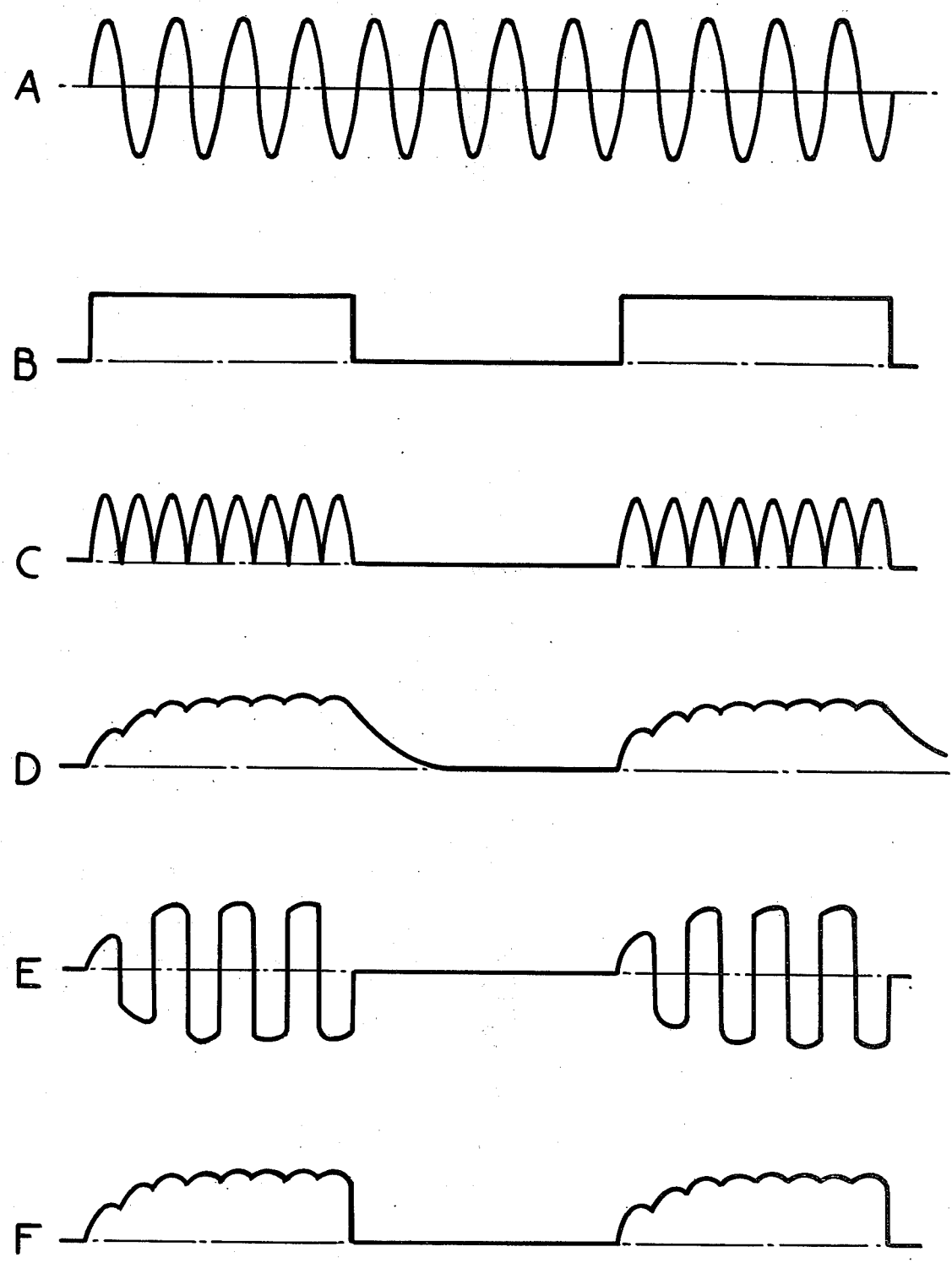

The operation of the first embodiment will now be explained in connection with FIGS. 3A to F. FIG. 3A is the waveform of the commercial power line source voltage. When switching element 20 is "on-off" controlled by switch drive circuit 19 as shown in FIG. 3B, a voltage, whose form is illustrated in FIG. 3C, is applied to excitation coil 5. As a consequence, an excitation current, as shown in FIG. 3D, flows through coil 5. Ripples included in this excitation current are substantially eliminated by the inductive function of the coil, whereas transient spikes which occur when switch 20 is turned to its "off" state are eliminated by the function of diode 10.

A current shown in FIG. 3E is detected by reference transformer 16 when switch 20 is in its "on" state, and the detected reference voltage at the secondary winding thereof is rectified by bridge 17 whose output junctions are connected to the ends of load resistor 18, whereby a reference voltage proportioned to the excitation current is detected.

FIG. 4 illustrates a preferred form of divider circuit 7 suitable for the magnetic flowmeter system shown in FIG. 2. Switching elements 21, 25a and 25b constitute sample switches. A flow signal Vi is applied to the summing input of a subtracting circuit 23, and a reference voltage Vr is applied through switch 21 and an RC smoothing circuit 22 to its subtracting input. The output of subtracting circuit 23 is applied to the input of an amplifier 24 whose output is fed through a parallel circuit constituted by sample switches 25a, 25b to a subtracting circuit 27. The output therefrom, after being smoothed by RC smoothing circuit 28, is fed to a voltage-to-frequency converter 29 whose output is applied to a frequency-to-current converter 30. The output of voltage-to-frequency converter 29 also serves as an "on-off" control signal for sample switch 21, while a switch drive circuit 26 acts to effect "on-off" control of sample switches 25a and 25b.

Reference voltage Vr is sampled by switch 21 whose sample noises (transient spikes) are eliminated by RC smoothing circuit 22. The output from circuit 22 is applied to subtracting circuit 23 to whose summing input flow signal Vi is applied as a negative feedback voltage.

The output of subtracting circuit 23 is amplified by amplifier 24, and by way of sample switches 25a, 25b, inputs whose polarities are reversed with respect to each other are applied to respective inputs of subtracting circuit 27. The output of subtracting circuit 27 is converted into a d-c voltage having small ripple components by means of RC smoothing circuit 28, and then applied to voltage-to-frequency converter 29.

Figure 5:
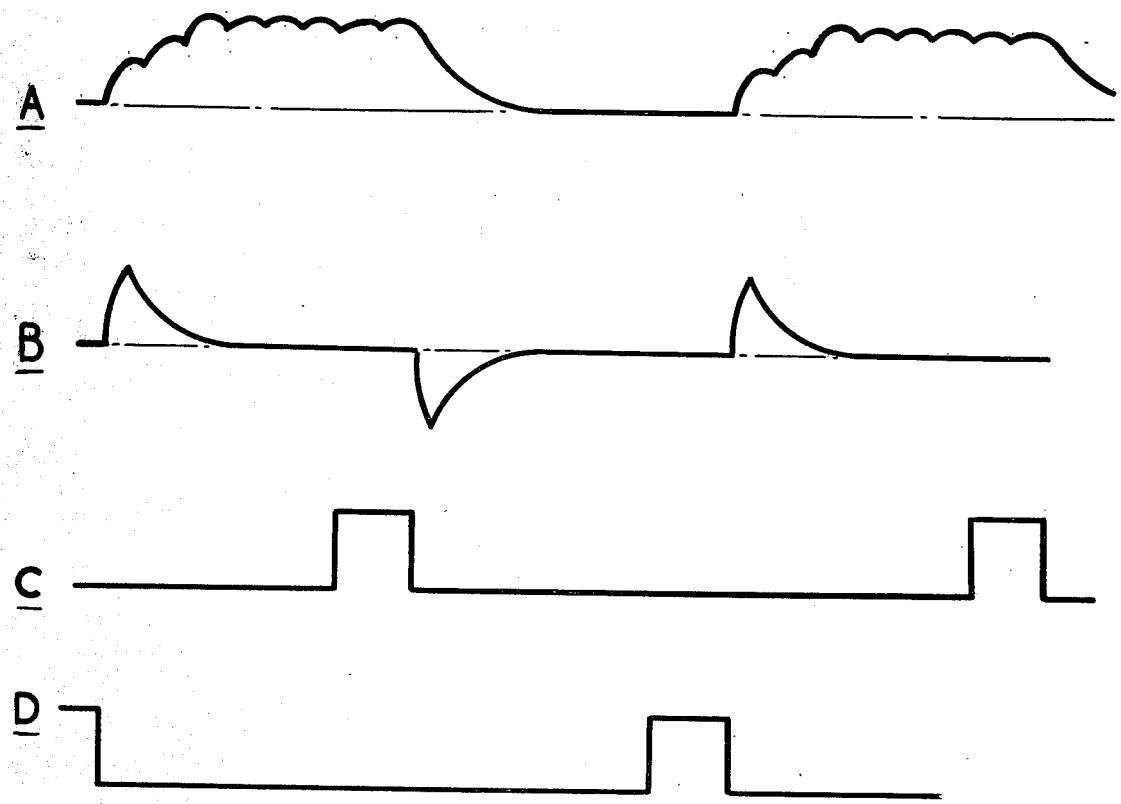

We will now explain in greater detail in connection with FIGS. 5A to D the function of the divider circuit 7 shown in FIG. 4. In these figures, FIG. 5A shows the waveform of flow signal Vi; FIG. 5B shows the waveform of the inductive noise components included in flow signal Vi which occur with transients in the excitation current; FIG. 5C is a waveform illustrating the operation of sample switch 25a, and FIG. 5D is a waveform illustrating the operation of sample switch 25b.

In this divider arrangement, assuming that the output frequency of voltage-to-frequency converter 29 is F, and that the amplification factor of amplifier 24 is adequate, the following equation can be established:

$$Vi = Vr \cdot F \quad (1)$$

In frequency-to-current converter 30, the relation between its input frequency F and its output current I is given by the following equation:

$$I = K_1 \cdot F \quad (2)$$

where $K_1$ is a constant.

Equation (2) can be rewritten from equation (1) as follows:

$$I = K_1 (Vi/Vr) \quad (3)$$

Since flow rate signal Vi is proportional both to excitation current i and mean flow velocity v, the following equation can be derived:

$$Vi = K_2 \cdot i \cdot v \quad (4)$$

where $K_2$ is a constant.

Further, since reference voltage Vr is proportional to excitation current i, the following equation can be derived:

$$Vr = K_3 \cdot i \quad (5)$$

where $K_3$ is a constant.

In the light of equations (4) and (5), equation (3) can be rewritten as follows:

$$I = K_1 \cdot (K_2 \cdot i \cdot v)/(K_3 \cdot i) = (K_1 \cdot K_2/K_3) v \quad (6)$$

It will be evident from equation (6) that output current I is not influenced by fluctuations in excitation current i; hence the output signal of the flowmeter is unaffected by such fluctuations.

Sample switches 25a and 25b function to sample the flow rate signal when the excitation current is stabilized to the fullest extent, switch 25a serving to sample the flow rate signal when coil 5 is excited, and switch 25b serving to sample the signal when coil 5 is non-excited. By reason of sample switches 25a and 25b, d-c noise component included in the flow rate signal can be eliminated.

In the arrangement in accordance with the invention, reference voltage detection is carried out by detecting the current of the commercial power line source, the following advantages being realized therefrom:

(1) Since the frequency of the current detected by the reference transformer is relatively high—i.e., 50 or 60 Hz, compared with the frequency of the excitation current—highly accurate signal detection can be effected by means of a small size current transformer.

(2) Since a high level reference voltage can be obtained at the secondary winding of the transformer, it is possible to omit amplifier 9 which is otherwise necessary in a conventional configuration.

(3) Since isolation between the commercial power line frequency source and the reference voltage is established by the reference transformer, the power transformer 14 necessary in a conventional arrangement may be omitted, thereby reducing the overall bulk of the apparatus.

Second Embodiment

FIG. 6 shows the second preferred embodiment of the invention. In the first embodiment shown in FIG. 2, switch 20 is interposed between rectifying bridge 15 and excitation coil 5, in place thereof it is possible to arrange the switching element between the commercial power line source 11 and the rectifying bridge 15.

In this case, a bi-directional type switching element such as a Triac may be used, or a circuit as shown in FIG. 6, which is constituted by a diode bridge 31 and a d-c switching element 32 such as a thyristor. With this construction, since rectifying bridge 15 carries out the same function as that of diode 10 provided in the first embodiment, the diode may be omitted therefrom.

Third Embodiment

FIG. 7 shows the third embodiment of the invention, in which the primary winding of reference transformer 16 adapted to receive the commercial power line current is divided into two half-sections, 16a1 and 16a2, and these winding sections are respectively interposed into two of the diode arms of rectifying bridge 15.

Fourth Embodiment

In FIG. 8, switching elements 33, 34, such as thyristors, are provided in rectifying bridge 15, so that switch 33 adjacent a diode 35 may be opposed to a diode 36, and switch 34 adjacent a diode 36 may be opposed to diode 35. The junction between switches 33, 34 is connected to the one end of excitation coil 5. These switches are "on-off" controlled differentially by a switch drive circuit 37.

Figure 9:
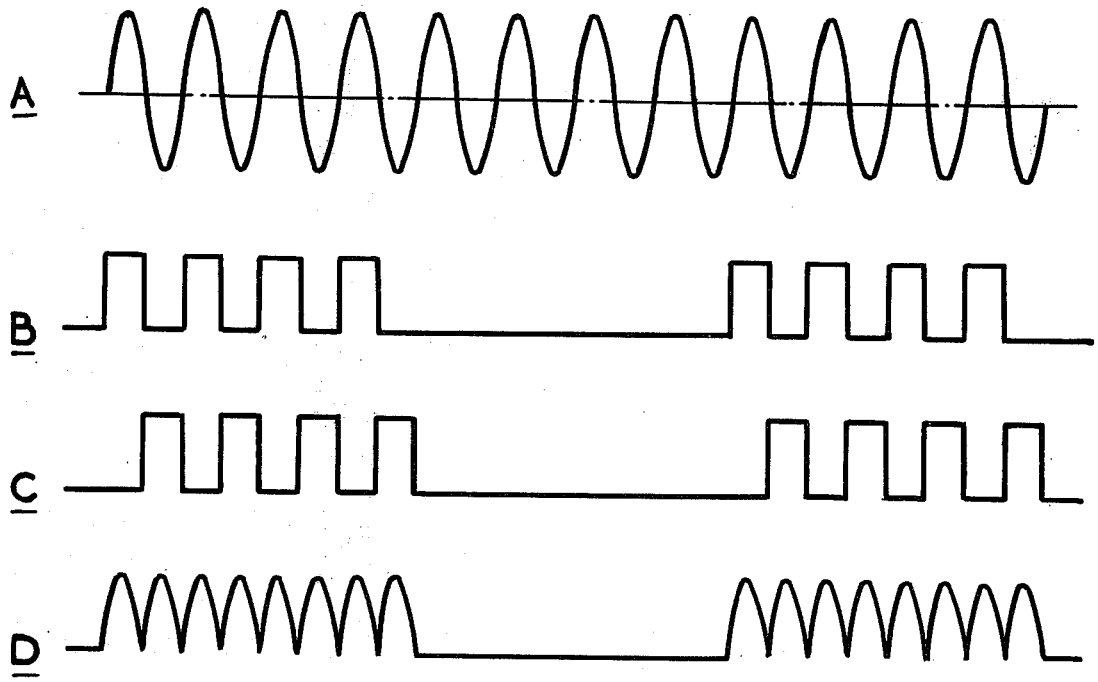

The function of the circuit shown in FIG. 8 will now be explained in connection with FIGS. 9A to D. The commercial power line source voltage, as shown in FIG. 9A, is applied to rectifying bridge 15. Switches 33, 34 are "on-off" controlled differentially in proportion to the commercial power line frequency, as shown in FIGS. 9B and C, respectively. Thus a supply voltage as shown in FIG. 9D is obtained.

Fifth Embodiment

FIG. 10 shows the fifth embodiment in accordance with the invention. In this embodiment, the excitation current changes in a manner whereby positive excitation and negative excitation states are repeated alternately. Or a positive excitation state and a non-excitation state in which excitation current becomes zero, and a negative excitation state and non-excitation state are repeated in the above-noted order.

The respective movable contacts of switches 38a and 38b are cyclically transferred over to the fixed contacts on either side thereof, thereby producing a low-frequency excitation current having both positive and negative levels. A series circuit composed of a resistor 41 and a capacitor 42 is connected in parallel to the excitation current circuit, thereby bypassing transient spikes. In this embodiment, a synchronous rectifying circuit 40 is employed for rectifying the detected reference voltage. Switches 38a and 38b are driven by drive circuit 39.

Sixth Embodiment

FIG. 11 shows the sixth embodiment of the invention. In this embodiment, a reference transformer 16, such as in FIG. 7, is incorporated in a rectifying bridge 15 of the type shown in FIG. 8, in which half sections 16a1, 16a2 of the primary winding of reference transformer 16 serve to detect the currents flowing in two of the arms in bridge circuit 15.

Seventh Embodiment

FIG. 12 shows the seventh embodiment of the invention. The secondary winding of a power transformer 43 whose primary winding is connected to commercial power line source 11 is connected through diodes 44, 45 to the primary winding of reference transformer 16. Between a center tap of the secondary winding of transformer 43 and a center tap of the primary winding of reference transformer 16, a series circuit constituted by switch 20 and excitation coil 5 is interposed. Although power transformer 43 is necessarily included in this embodiment, other drawbacks incident to a conventional apparatus can be eliminated.

Figure 13:
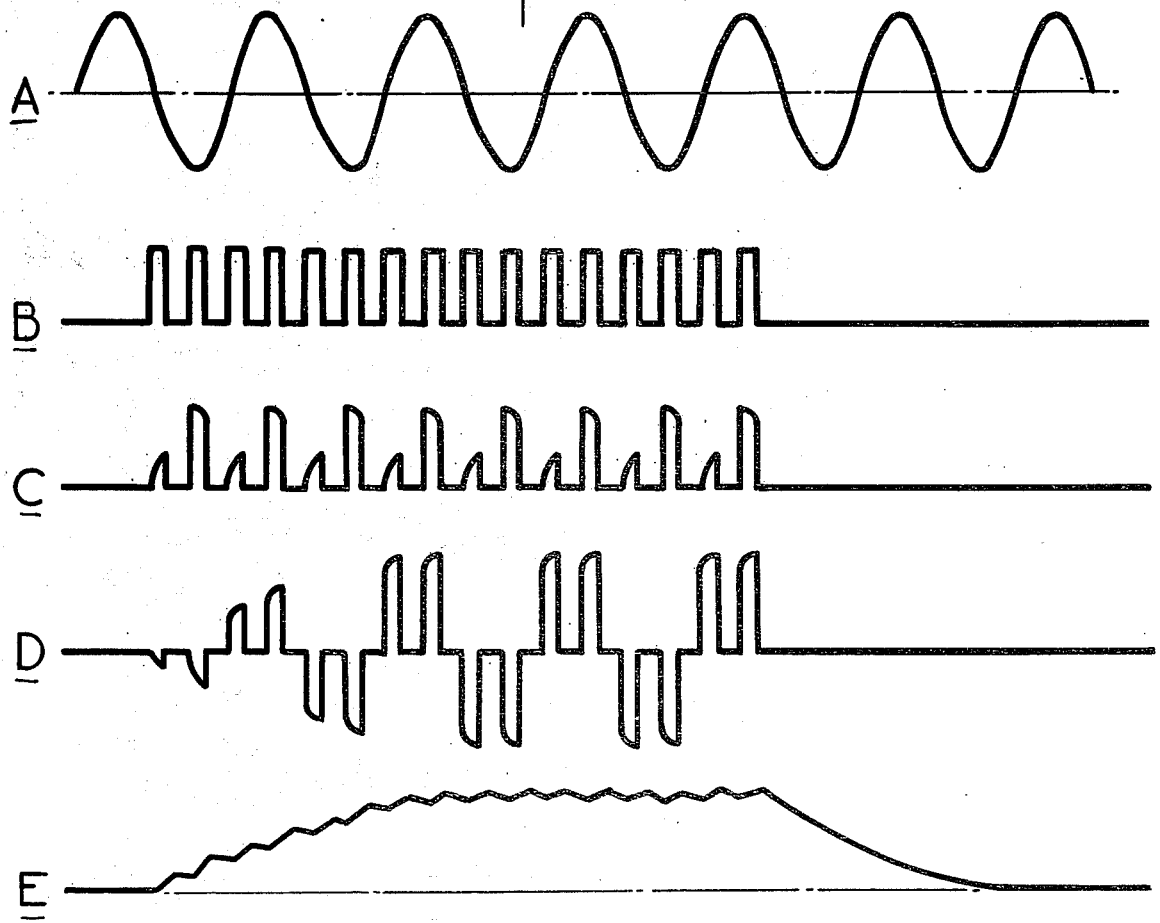

It is also possible to employ a method wherein the "on-off" duty ratio of the switching control signal for switch 20 is changed. For example, even though, in the second embodiment shown in FIG. 6, switching element 32 is controlled by the low-frequency rectangular wave, as shown in FIG. 3B, it is possible to control the same switching element by a wave form, as shown in FIG. 13B. By this arrangement, the amplitude of excitation current may easily be adjusted by changing the "on-off" duty ratio of the switching element.

FIGS. 13A to E are waveforms illustrating the operation of the above-described device, wherein FIG. 13A shows a waveform of the commercial power line source voltage; FIG. 13B shows "on-off" control signal generated by switch drive circuit 19; FIG. 13C shows the voltage supplied to excitation coil 5 by rectifying bridge 15, FIG. 13D shows the current flowing in reference transformer 16; and FIG. 13E shows the excitation current flowing in excitation coil 5.

This arrangement has many features, among which are the following:

(1) Although in a conventional apparatus, when one must use different power sources having different voltages such as 100 V and 200 V, magnetic flowmeters having different excitation coils must be designed to be energized by each source, with this embodiment, the same flowmeter may be used with different power sources simply by adjusting the "on-off" duty ratio of the switching element.

(2) Accordingly, it is possible to reduce the number of flowmeter models and to change the power source after the flowmeter has been installed.

(3) The amplitude of the excitation current may be changed easily.

Eighth Embodiment

FIG. 14 shows the eighth embodiment of the invention. In this embodiment, both the reference voltage and the flow rate signal are sampled by means of sample switches 46, 47 when the excitation current becomes stable. A switch drive circuit 48 serves to control switches 32, 46, 47.

FIGS. 15A to G illustrate the operation of this embodiment. In these figures, FIGS. 15A to E correspond to FIGS. 13A to E. FIG. 15F shows a reference voltage generated across load resistor 18, and FIG. 15G shows an "on-off" output of switch drive circuit for controlling sample switches 46, 47.

Also, by using an arrangement capable of altering the on-off duty ratio of the switching element, it is possible to improve the rise-up characteristics of the excitation current at its leading edge by changing the on-off duty ratio of the switching element at that period.

Ninth Embodiment

FIG. 16 shows the ninth embodiment of the invention. Although in the previous embodiments the switching element serving to chop the commercial power line supply is used in order to produce the low-frequency excitation current, in this embodiment, an a-c power source constituted by a signal generator 49 and power amplifier 50 is used in place thereof.

FIG. 17A shows the waveform generated by signal generator 49, and FIG. 17B shows the low-frequency excitation current flowing in excitation coil 5. In the same arrangement, it is also possible to produce a sinusoidal wave low-frequency excitation current such as shown in FIG. 18B by use of signal generator 49 which generates a signal of the type shown in FIG. 18A.

Tenth Embodiment

FIG. 19 shows the tenth embodiment of the invention, in which a low-frequency excitation current having a constant level may be obtained. In this figure, a transistor 51 is interposed between rectifying bridge 15 and excitation coil 5, and serves to control the level of the excitation current. A reference signal from a signal generator 53 is applied to a non-inverting input of an amplifier 52 which constitutes a transistor drive circuit.

Figure 20:
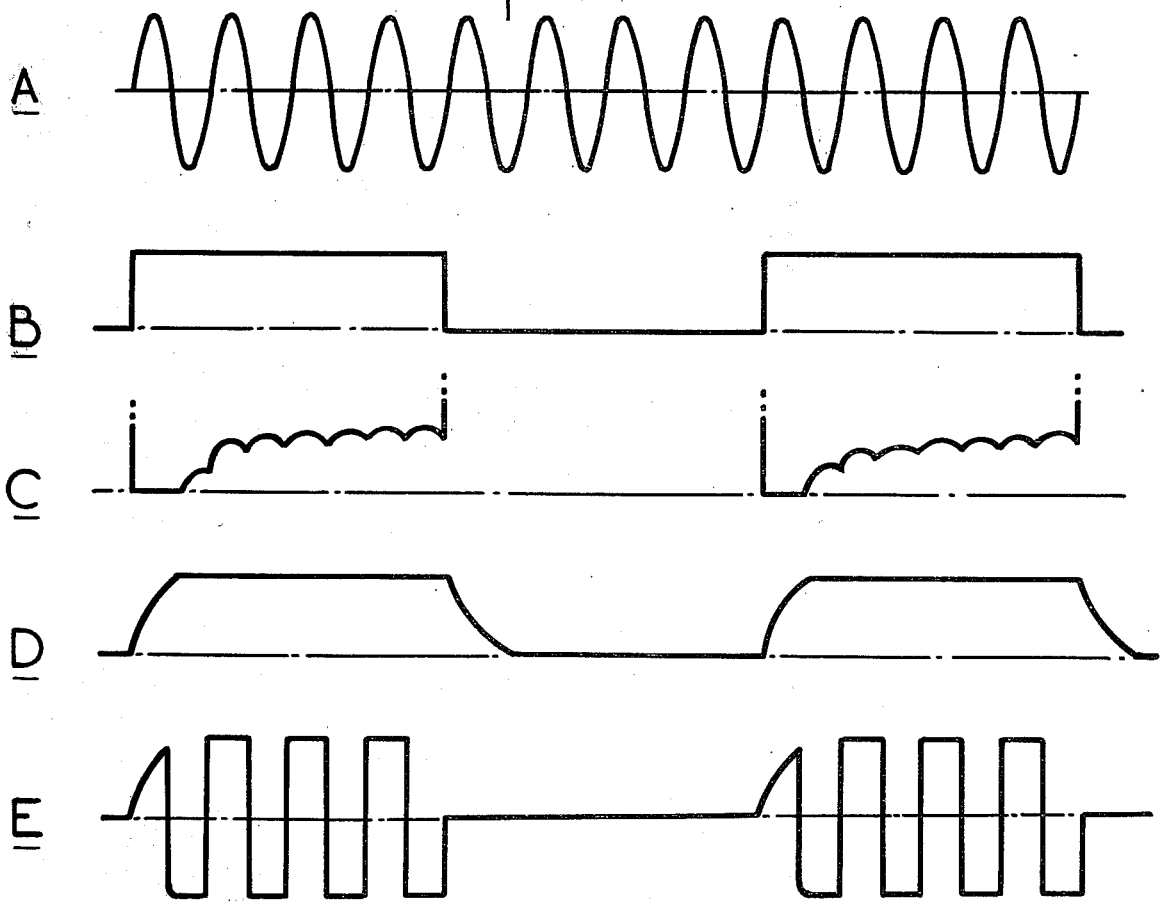

FIGS. 20A to E show wave forms illustrating the operation of the circuit shown in FIG. 19. In these figures, FIG. 20A shows a waveform of the voltage of the commercial power line source; FIG. 20B shows a reference signal for controlling the excitation current; FIG. 20C represents the state of the internal resistance variation of transistor 51; FIG. 20D shows an excitation current which flows in excitation coil 5; and FIG. 20E shows a waveform of a reference voltage derived from the secondary winding of reference transformer 16.

With this configuration, the excitation current is controlled by means of transistor 51 in accordance with the reference voltage detected by reference transformer 16, whereby the amplitude of the excitation current in the "on" state is made constant.

Eleventh Embodiment

FIG. 21 shows the eleventh embodiment of the invention, in which an excitation current is made constant by controlling the on-off duty ratio of a switching element. In this figure, a voltage-to-duty cycle converter 54 is controlled by the output of amplifier 52, and the output of converter 54 is applied to a switching element 55.

As explained previously, since the reference transformer in accordance with the invention is arranged to operate with a power supply having a comparatively high frequency—i.e., 50 or 60 Hz.—highly precise signal detection can be accomplished by means of a normally-used small size current transformer.

Although the invention has been explained mainly in connection with a low-frequency excitation type magnetic flowmeter, the invention may also be used in a d-c excitation type magnetic flowmeter.

While there have been shown and described preferred embodiments of a magnetic flowmeter in accordance with the invention, it will be appreciated that many changes and modifications may be made therein without, however, departing from the essential spirit thereof.

I claim:

1. In combination with a magnetic flowmeter in which the fluid to be metered is conducted through a flow tube having detecting electrodes, the fluid intercepting the magnetic field produced by an electromagnet having an excitation coil to induce a flow rate signal in said electrodes, said flow rate signal being subject to unwanted fluctuations as a result of fluctuations in the current exciting said coil, said system comprising:

A. rectification means coupled to a commercial power line source whose a-c power has a relatively high-frequency to produce a direct-current voltage, and means including a periodically-actuated switch to apply said voltage across said coil at a rate whose frequency is low relative to the power line frequency to cause an excitation current to flow through said coil;

B. a reference voltage-detecting transformer whose primary is interposed between said a-c source and said rectification means and whose secondary yields a voltage that depends on fluctuations in said excitation current and having a frequency corresponding to the power line frequency;

C. means coupled to said secondary to derive a reference-voltage signal from said secondary; and D. means to apply said reference voltage signal and said flow rate signal to a converter to produce an output flow rate signal free of said fluctuations.

2. The combination as set forth in claim 1, wherein said converter is a divider.

3. The combination as set forth in claim 1, further including a diode shunted across said excitation coil to eliminate transient spikes.

4. The combination as set forth in claim 1, wherein said means coupled to said secondary to derive the reference voltage signal therefrom is a rectifier bridge.

5. The combination as set forth in claim 4, further including a load resistor connected across the output junctions of said bridge.

* * * * *